United States Patent
Born et al.

(10) Patent No.: US 10,985,679 B2
(45) Date of Patent: Apr. 20, 2021

(54) CONTINUOUSLY ROTATING ELECTRIC MOTOR HAVING A PERMANENT MAGNET ROTOR

(71) Applicant: The Swatch Group Research and Development Ltd, Marin (CH)

(72) Inventors: Jean-Jacques Born, Morges (CH); Laurent Nagy, Liebefeld (CH); Christophe Germiquet, Preles (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/687,803

(22) Filed: Nov. 19, 2019

(65) Prior Publication Data

US 2020/0186061 A1    Jun. 11, 2020

(30) Foreign Application Priority Data

Dec. 6, 2018 (EP) ..................................... 18210841

(51) Int. Cl.
*H02P 6/15* (2016.01)
*G04C 3/16* (2006.01)

(52) U.S. Cl.
CPC ................ *H02P 6/157* (2016.02); *G04C 3/16* (2013.01)

(58) Field of Classification Search
CPC .................................. H02P 6/157; G04C 3/16
USPC ............................. 318/400.13, 400.01, 700
See application file for complete search history.

(56) References Cited

U.S. PATENT DOCUMENTS

| 4,492,910 | A | 1/1985 | Radacanu |
| 8,624,531 | B2 * | 1/2014 | Wu ...................... H02P 29/0241 |
| | | | 318/400.02 |
| 2004/0008105 | A1 | 1/2004 | Rota et al. |

FOREIGN PATENT DOCUMENTS

| EP | 0 887 913 A2 | 12/1998 |
| WO | WO 02/46847 A1 | 6/2002 |

OTHER PUBLICATIONS

European Search Report dated May 14, 2019 in European Application 18210841.5 filed Dec. 6, 2018 (with English Translation of Categories of Cited Documents).

* cited by examiner

*Primary Examiner* — David Luo
(74) *Attorney, Agent, or Firm* — Oblon, McClelland, Maier & Neustadt, L.L.P.

(57) ABSTRACT

A continuously rotating electric motor includes a rotor provided with permanent magnets and a stator formed by two coils in which, when the rotor is rotating, two induced voltage signals ($U_{B1}$ and $U_{B2}$) are respectively generated, which signals have an electric phase shift $\varphi$ where $5° \leq \varphi \leq 90°$, preferably $30° < \varphi < 65°$. The control device includes a circuit for detecting intersection times ($T_C$) at which values of the two induced voltage signals are substantially equal. The control device is arranged to generate electric driving pulses to rotate the rotor, which are respectively initiated at initiation times determined by respective intersection times, and such that the electric driving pulses can be applied to the two coils arranged in series. Preferably, the control device is arranged such that the initiation times of the electric driving pulses occur directly after detections of corresponding intersection times.

10 Claims, 6 Drawing Sheets

| | Pole pitch | Geometric phase shift between the coil B2 and the magnets of the rotor | Angle at the centre between the two coils B1 and B2 | Electric phase shift of the two coils |
|---|---|---|---|---|
| Rotor with two pairs of magnets having alternating polarities and arranged on a disc | 180° | 30° | 120° | 60° / 360° |
| Rotor with three pairs of magnets having alternating polarities and arranged on a disc | 120° | 20° | 100° | 60° / 360° |
| Rotor with four pairs of magnets having alternating polarities and arranged on a disc | 90° | 15° | 120° | 60° / 360° |

Fig. 5

| | Pole pitch | Geometric phase shift between the coil B2 and the magnets of the rotor | Angle at the centre between the two coils B1 and B2 | Electric phase shift of the two coils |
|---|---|---|---|---|
| Rotor with two pairs of magnets having alternating polarities and arranged on a disc | 180° | 30° | 120° (3a) | 60°, 360° |
| Rotor with three pairs of magnets having alternating polarities and arranged on a disc | 120° | 20° | 100° (3b) | 60°, 360° |
| Rotor with four pairs of magnets having alternating polarities and arranged on a disc | 90° | 15° | 120° (3c) | 60°, 360° |

CONTINUOUSLY ROTATING ELECTRIC MOTOR HAVING A PERMANENT MAGNET ROTOR

CROSS-REFERENCE TO RELATED APPLICATION

This application claims priority to European Patent Application No. 18210841.5 filed on Dec. 6, 2018, the entire disclosure of which is hereby incorporated herein by reference.

TECHNICAL FIELD

The present invention relates to the field of continuously rotating electric motors having a rotor provided with permanent magnets and a stator formed by coils. The coils preferably have no magnetic core, whereby the magnets and the coils are arranged such that the magnetic flux of the magnets are directly coupled with the coils.

In particular, the invention relates to electric motors of small dimensions intended for horological applications. They are in particular incorporated into watch movements of the electromechanical type with an analogue display.

TECHNOLOGICAL BACKGROUND

In the horological field, electric motors used in electromechanical watches are generally stepping motors. These motors have a magnetic stator which defines rest positions for the rotor provided with a permanent magnet. During driving pulses, the flux generated by one or more coils, wound around one or more respective magnetic cores of the stator, allows the rotor to be driven in steps. The supply voltage required to generate these driving pulses generally lies in the range 1.2 to 1.5 Volts. An analysis of the induced voltage in either coil after each driving pulse allows it to be determined whether the step has been correctly performed. If this is not the case, a correcting pulse is provided. In a stepping motor, since the rotor is at a standstill in a determined angular position, no particular issues hinder synchronisation between the angular position of the rotor and the successive initiations of the driving pulses.

Horological stepping motors have passed the test of time, are reliable and can have lower consumption levels in particular thanks to hashing of the signal forming each driving pulse, which technique is referred to as 'PWM— Pulse Width Modulation'. However, stepping motors tend to generate noise when turning through steps, which can be inconvenient for a user, especially at night. Moreover, this stepped turning of the hands, in particular of the seconds hand, is a distinctive sign of electromechanical watches, which visible sign is not always advantageous in the eyes of the consumer. In order to overcome these issues, a watch movement can incorporate a continuously rotating electric motor of small dimensions of the type having a rotor provided with permanent magnets.

Patent document EP 0887913 A2 describes a method for controlling a continuously rotating micromotor intended for a horological application. This motor comprises a stator formed by flat coils and a rotor provided with permanent magnets. The rotor comprises a first pair of magnets, of opposite polarities and arranged at the ends of a first oblong flange located beneath the coils of the stator, and a second pair of magnets, also of opposite polarities, arranged at the ends of a second oblong flange facing the first pair of magnets. The rotor thus defines a magnetic circuit for the flux of the four magnets passing through the coils when the rotor is rotating, such that an induced voltage is generated in these coils. The aforementioned document proposes two embodiments for the stator. In a first embodiment, shown in FIG. 1 and FIG. 2 of the aforementioned document, the stator comprises three flat coils arranged in a general plane perpendicular to the rotational axis of the rotor. These three coils are offset by 120°. Since the rotor has a single pair of magnets of opposite polarities per flange, the magnetic period/pole pitch of the rotor is equal to 360°. The three coils are constantly arranged in series, such that the signal of the total induced voltage at the two output terminals of the electric circuit formed by the three coils has a sinusoidal shape with a period of 120°. In order to maintain the rotation of the rotor, the control method provides for applying driving voltage pulses to the coils in series, which pulses have a given duration of less than one quarter of a period of the induced voltage signal, and for initiating each driving voltage pulse after a fixed time interval $t_1$ after the total induced voltage signal passes through zero. The time interval $t_1$ is chosen such that, for a nominal rotational speed of the rotor, the driving voltage pulses occur in the areas of maximum voltage but slightly in advance. In FIG. 4 of the aforementioned document, these pulses can be seen to begin before the apexes of the total induced voltage signal and substantially end at the maximum value of this signal. As shown in the aforementioned document with reference to FIG. 5, this choice allows a certain level of self-regulation to be obtained as regards the rotational speed of the rotor.

The first embodiment of the patent document EP 0887913 A2 is faced with issues concerning efficiency and robustness in the event of impacts or sudden movements. If, during an impact, the rotor undergoes sudden acceleration, the driving voltage pulse occurs after passing through the maximum value of the induced voltage, such that the energy supplied is thus greater than that intended for rotation at a constant nominal speed. This situation results in the rotor accelerating even more during a certain number of periods of the total induced voltage signal until it gradually begins to be slowed down. This causes instability. Moreover, during arm movements of a user of a watch not related to impacts, the rotor undergoes small variations in rotational speed. The method provided further causes instabilities in such a case, since the driving voltage pulses occur at different moments in time relative to the times at which the induced voltage signal has a maximum absolute value, i.e. in the form of an absolute value, which causes the quantity of energy supplied to the rotor during each driving pulse to vary. Although there is a certain degree of self-regulation when the rotational speed is slowing down, this does not apply when this speed is increasing; instead the opposite occurs.

As regards the configuration of the motor in the first embodiment, it should be noted that the three coils occupy almost the whole space around the shaft of the rotor in the general plane thereof, such that no mechanical coupling can occur in this plane between the rotor and a wheel of a gear train driven by this rotor. Such a configuration thus requires a mechanical coupling in a plane that is higher or lower than the part of the rotor formed by the two flanges and the permanent magnets (it should be noted that the magnets must be located in the vicinity of the coils in order to ensure good coupling between the magnets and the coils). This creates issues regarding the overall dimensions since it requires a relatively tall construction, wherein the rotor is offset in terms of height relative to the wheel which meshes with the output pinion for the mechanical torque supplied by the electric motor, which pinion must be situated on the shaft of the rotor above/below the aforementioned rotor part.

In the second embodiment proposed in the patent document EP 0887913 A2, an identical rotor is provided, alongside a stator formed by only two flat coils that are diametrically opposite relative to the rotational axis of the rotor. In such a case, it is understood that the two coils must each have a winding direction of the electric wire that is opposite that of the other so as to procure a non-zero induced voltage at the terminals of the two coils which are constantly arranged in series. The control method described hereinabove has the same drawbacks in this case. It is in particular noted that, although one coil has been removed, the problem concerning the overall dimensions remains the same. A wheel can hardly be arranged in the general plane of the two coils, which could be coupled with a pinion of the shaft provided in this general plane. If looking to nonetheless produce such an assembly, the wheel must have a small diameter such that the reduction ratio between the rotor and this wheel of the driven gear train is low, which is generally a drawback since an additional wheel will be necessary. This second embodiment creates another problem in that the arrangement of the two coils with an electric phase shift equal to zero no longer allows the direction of rotation of the rotor to be determined without adding an additional sensor for this purpose, which is proposed in the final paragraph of the description of the document in question.

The electric motor disclosed in the patent document EP 0887913 A2 presents another problem. The arrangement provided for does not allow the electric motor to be effectively started, i.e. the rotor to be brought into rotation, without the arrangement of an additional magnetic element external to the motor. More specifically, in order to allow the motor to be started, a magnet for positioning the rotor at rest (not driven) is added to the periphery of the rotor. This magnet thus constantly interacts with the magnets of the rotor and not only when the latter is at rest. This causes disturbance as regards the continuous rotation of the rotor at a speed that is sought to be as stable as possible.

SUMMARY OF THE INVENTION

The overall purpose of the present invention is to provide an electric motor that at least partially overcomes the problems of the electric motor of the prior art described hereinabove as well as more specifically to provide a main embodiment of such an electric motor that overcomes all of the aforementioned problems. Moreover, a horological electromechanical movement is provided for, which movement is equipped with a motor according to the main embodiment of the invention.

For this purpose, the present invention relates to a continuously rotating electric motor comprising a rotor provided with permanent magnets and a stator formed by coils, wherein the permanent magnets and the coils are arranged such that the coils define, relative to the induced voltage generated in each of these coils when the rotor is driven in rotation, substantially a first phase and a second phase. Thus, two induced voltage signals capable of being respectively generated in any two coils of the coils of the electric motor are either in phase, or substantially have an electric phase shift $\varphi$ which corresponds to the electric phase shift between the first phase and the second phase. As a whole, this electric phase shift has a value of between five and ninety degrees included ($5° \leq \varphi \leq 90°$). Moreover, the electric motor comprises a control device comprising a circuit for detecting intersection times at which a first induced voltage signal, generated by the rotor rotating in one or more coils belonging to the first phase, has a value that is substantially equal to that of a second induced voltage signal, generated by the rotor rotating in one or more coils belonging to the second phase, the first and second induced voltage signals thus having said electric phase shift therebetween. The control device is arranged so as to be able to generate electric driving pulses in order to rotate the rotor, which pulses are respectively initiated at initiation times determined by respective intersection times, the control device being arranged such that said electric driving pulses can be applied to a set of coils formed at least by one coil of the first phase and at least by one coil of the second phase, which are arranged in series during application of the electric driving pulses.

In a preferred alternative embodiment, the electric phase shift $\varphi$ has a value of between thirty and sixty-five degrees ($30° < \varphi < 65°$).

In a preferred alternative embodiment, the control device is arranged such that the initiation times at which the electric driving pulses are initiated occur directly after detections of corresponding intersection times, whereby no time delay is provided for the generation of these electric driving pulses subsequent to the detections of the corresponding intersection times.

In one advantageous alternative embodiment, the supply voltage applied, upon application of said electric driving pulses, through said at least one coil of the first phase and said at least one coil of the second phase, which are thus arranged in series, is provided such that it is greater than the maximum value of the sum of the induced voltages thereof and less than one hundred and fifty percent (150%) of this maximum value when the rotor is turning with a nominal angular speed.

In one specific embodiment, the control circuit further comprises at least one switch arranged so as to allow at least one coil of the first phase and at least one coil of the second phase to be powered separately and selectively, the control circuit being arranged such that it can, during a start-up phase of the electric motor, firstly power one of the first or second phases in order to position the rotor, then the other of these first or second phases in order to cause the rotor to rotate in the desired direction.

In one advantageous alternative embodiment, the control device further comprises at least one switch momentarily allowing the one or more coils generating the first induced voltage signal to be electrically isolated from the one or more coils generating the second induced voltage signal in order to allow the intersection times to be detected by the detection circuit. The detection circuit comprises a comparator, the two inputs whereof are respectively connected to a first terminal of the one or more coils generating the first induced voltage signal and to a first terminal of the one or more coils generating the second induced voltage signal. In particular, the control device is arranged such that, during detection phases for detecting said intersection times, the two corresponding second terminals are momentarily connected via two respective switches to a reference voltage.

In one specific alternative embodiment, the control circuit further comprises a comparator, the two inputs whereof are connected to two terminals of a coil or of a set of coils belonging to one of the first or second phases, so as to allow the direction of rotation of the rotor to be detected in association with the circuit for detecting intersection times.

In one main embodiment, the stator is formed by only two flat coils which respectively constitute the first and second phases, whereby the magnets of the rotor have an alternating axial polarisation.

BRIEF DESCRIPTION OF THE FIGURES

The invention will be described in more detail hereafter with reference to the accompanying drawings, provided by way of illustration only and not intended to limit the scope of the invention, wherein:

FIG. 5 is a diagrammatic view, in table form, of three alternatives to the main embodiment wherein the rotors of the three corresponding electric motors have, in the arrangement of the magnets thereof, different pole pitches, namely 180°, 120° and 90°.

DETAILED DESCRIPTION OF ONE MAIN EMBODIMENT

Figure 1:
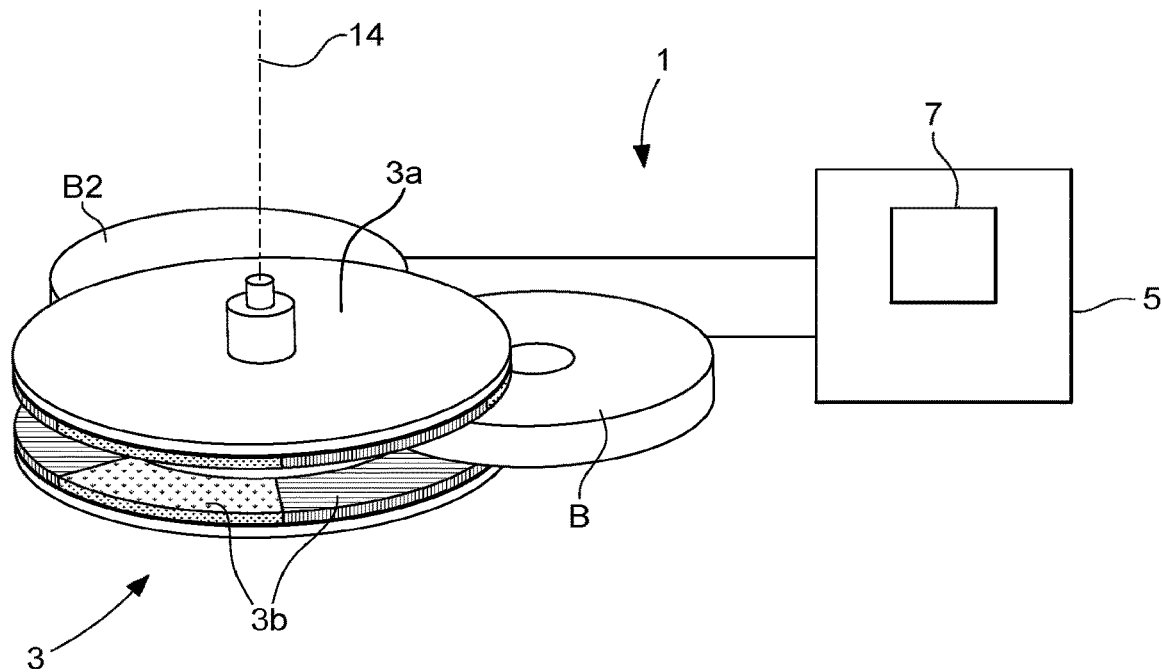
FIG. 1 is a diagrammatic view of a main embodiment of a continuously rotating electric motor of the invention.

FIG. 1 diagrammatically shows a continuously rotating electric motor 1 according to one main embodiment of the invention. This electric motor comprises a stator formed by only two flat coils A and B and by a rotor 3 comprising two parallel flanges with high magnetic permeability 3a bearing magnets 3b. The two parts respectively formed by the two flanges bearing the magnets thereof define therebetween an intermediate space into which the two flat coils B1 and B2 penetrate. The magnets and the two flat coils are arranged so as to have a magnetic coupling therebetween such that, when the rotor is rotated, a periodic induced voltage signal is generated in each of the two coils. Each of the flanges 3a bears, on the same side as the intermediate space, magnets or magnetised parts 3b arranged in an even manner about the rotational axis 14 and having an alternating axial polarisation, i.e. the magnetic polarisation of the magnets or magnetised parts is substantially parallel to the axis 14, or more generally the magnetic flux generated by these magnets or magnetised parts in the aforementioned intermediate space is mainly directed along the axis 14 and the two magnetic polarities of any pair of adjacent magnets are opposite. In particular, the two flanges are made of ferromagnetic material.

The permanent magnets 3b and the two coils B1, B2 are arranged such that these two coils respectively define a first phase and a second phase in relation to the induced voltage generated in each thereof when the rotor 3 is rotating. Thus, the two periodic induced voltage signals, which are respectively generated in the two coils when the rotor is rotating, have a non-zero electric phase shift φ corresponding to the electric phase shift between the two coils, i.e. between the first phase and the second phase. This electric phase shift has, in one general alternative embodiment, a value of between five and ninety degrees included (5°≤φ≤90°).

The electric motor 1 further comprises a control device 5 that is electrically connected to the two coils (diagrammatically indicated by two lines in FIG. 1). This control device is in particular used to manage the application of electric driving pulses (also referred to as 'driving pulses') to rotate the electric motor according to a control method that implements the detection of the intersection times of the aforementioned two periodic induced voltage signals in order to determine the initiation times of these driving pulses which are applied through the two coils arranged in series at least during the application of the driving pulses. Thus, the control device is arranged so as to be able to generate driving pulses through two coils arranged in series and this control device comprises a circuit 7 for detecting intersection times at which the first induced voltage signal, generated by the rotor rotating in one of the two coils B1 and B2 defining the first phase, has a value that is substantially equal to that of a second induced voltage signal, generated by the rotor rotating in the other of the two coils defining the second phase. It should be noted that the first and second induced voltage signals have the electric phase shift φ therebetween. The control device and the control method associated therewith are described in more detail hereafter.

Figure 3:
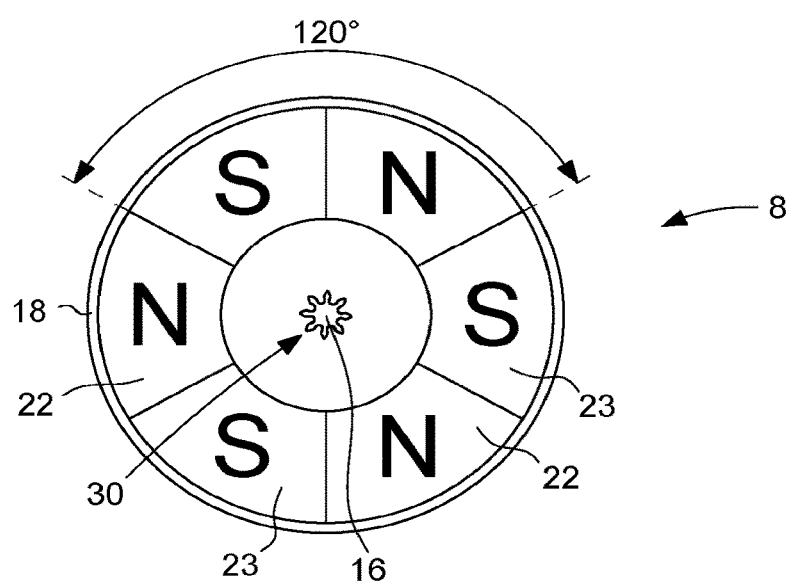
FIG. 3 is a view of a horizontal section of the rotor of the electric motor in FIG. 2.
Figure 2:
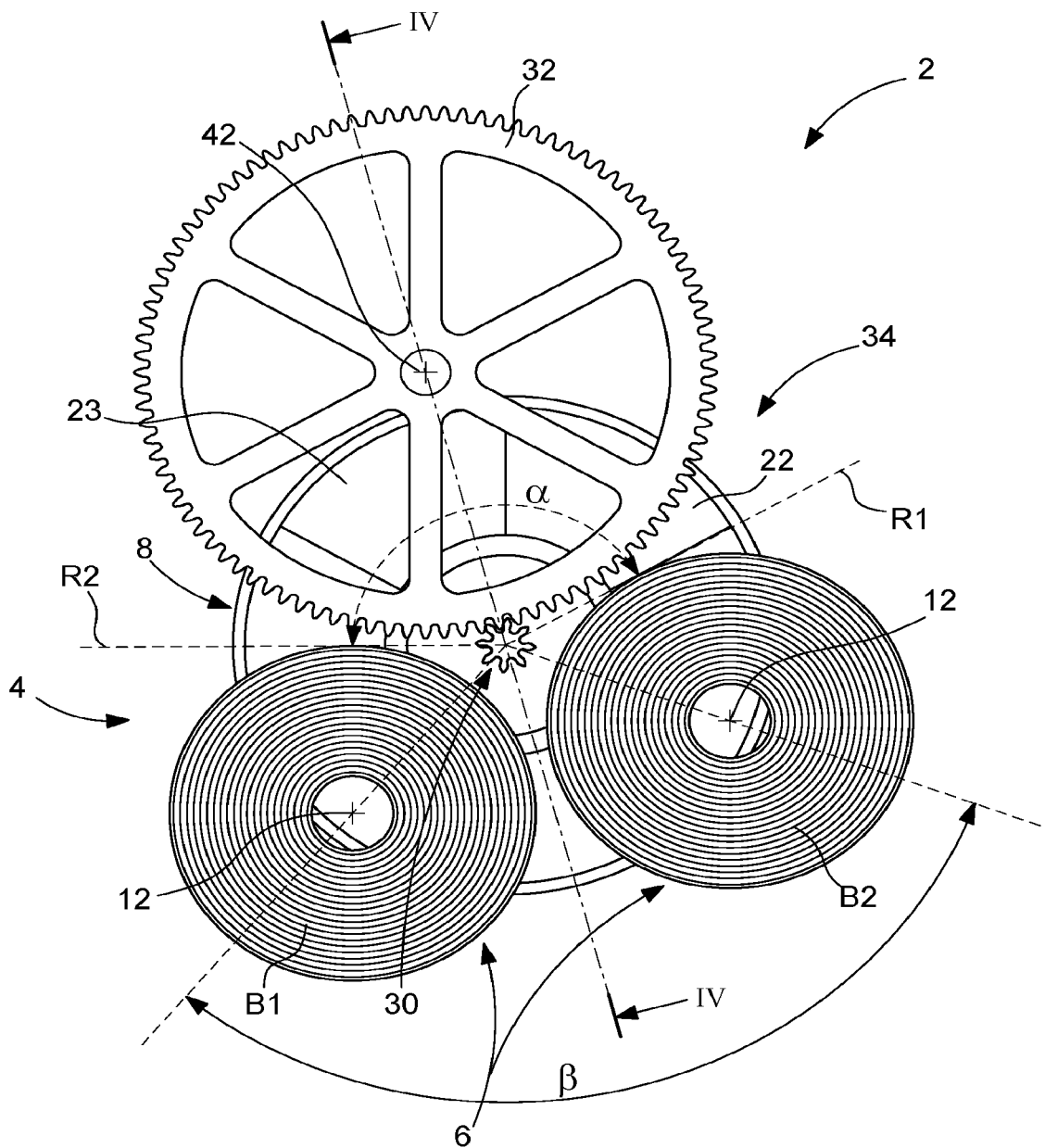
FIG. 2 is a partial view of a horizontal section of an electromechanical horological movement incorporating a specific alternative to the electric motor according to the main embodiment of the invention.
Figure 4:
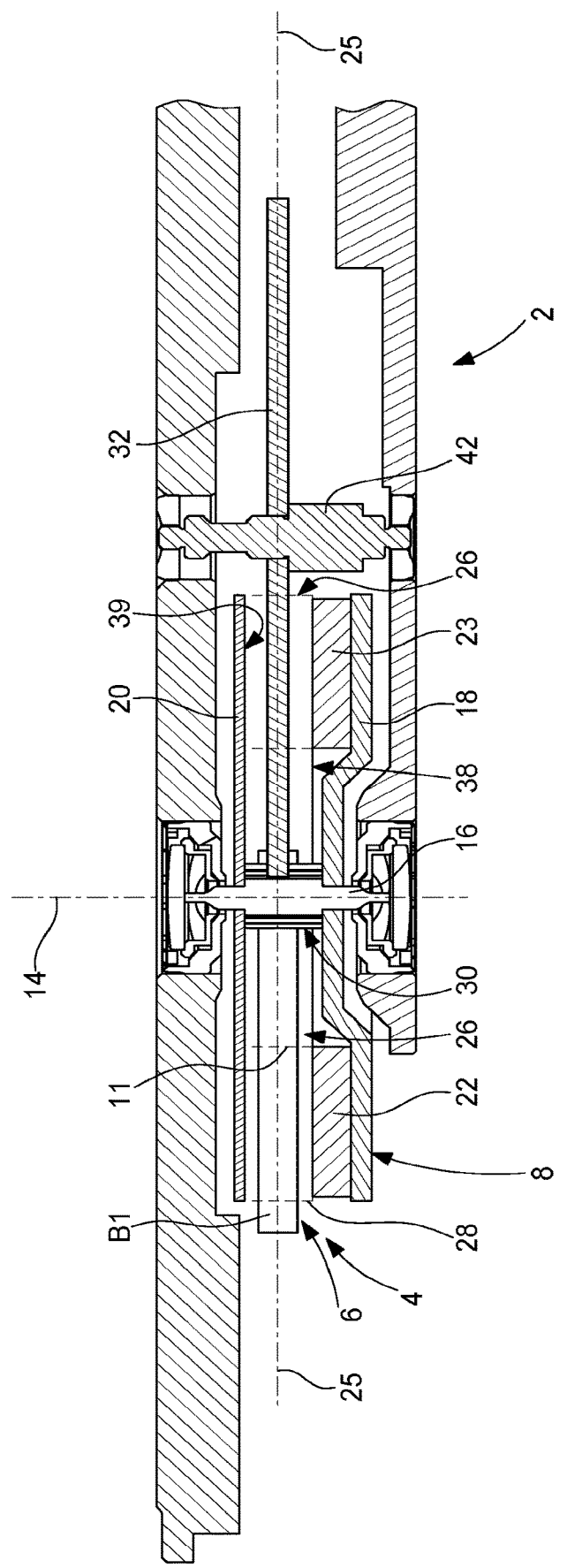
FIG. 4 is a view of a cross-section along the line IV-IV of the horological movement in FIG. 2.

With reference to FIGS. 2 to 4, an electromechanical horological movement is described incorporating a specific alternative to the electric motor according to the main embodiment of the invention. The horological movement 2 comprises an electric motor 4 formed by a stator 6 and a rotor 8. The stator comprises two flat coils B1 and B2, each having a central axis 12 which is parallel to the rotational axis 14 of the rotor. The coils shown have the shape of a flat disc. However, other outer profiles different from a circular profile can be considered, in particular an ovoid or trapezoid profile.

The rotor 8 comprises a central shaft 16, two sheets having high magnetic permeability 18 and 20 in the form of a disc (also referred to as 'magnetic sheets') which are mounted on the central shaft and a plurality of magnets or magnetised parts 22, 23 which are axially polarised and arranged in a fixed manner on the magnetic sheet 18 such that they are situated between the two magnetic sheets. In this alternative embodiment, the upper magnetic sheet 20 only acts as a plate for closing the field lines of the magnetic flux generated by the magnets. The two magnetic sheets jointly form a shielding structure used to substantially confine the magnetic flux of the magnets in the volume defined by the rotor and a small lateral volume at the periphery thereof. In another advantageous alternative embodiment (see FIG. 1), the magnets are borne equally by the two magnetic sheets. In such a case, the magnets are aligned axially in pairs of magnets having the same polarity so as to generate a substantially axial magnetic flux therebetween. In the alternative embodiment shown, the polarities of the magnets arranged on the same sheet are alternating, which differentiates the magnets 22 from the magnets 23. In this alternative embodiment, six magnets are provided on the magnetic sheet 18, i.e. three pairs of adjacent magnets having opposite polarities (see FIG. 3). The magnets are arranged in a circular and even manner on the magnetic sheet 18 so as to define a pole pitch of 120°. Other numbers of magnets and thus other pole pitches are provided in alternative embodiments, as will be described hereafter.

It should be noted that the magnets can be formed by 2N separate bipolar magnets which each have an axial polarisation and which are initially separated from one another before the fixing thereof on one of the two magnetic sheets; however, these magnets can also be formed by respective parts of an annular multipole magnet having 2N magnetic poles at the outer surface thereof which is opposite the ferromagnetic sheet to which it is fixed. In both cases, there are 2N pairs of magnetic poles with alternating North-South polarities at the outer surface of the bipolar magnets and of the multipole magnet, where N is an integer greater than zero and preferably greater than one.

The two flat coils B1 and B2 extend in a general plane 25 located between the two magnetic sheets 18 and 20, at an axial distance from the plurality of magnets. The rotor and the two coils are configured such that these two coils are partially located in a space of revolution 26 which is defined by the rotor between the two magnetic sheets thereof from the central shaft 16 thereof to the circumference 28 thereof and which is left clear by this rotor, in particular by the magnets thereof. The central shaft comprises a pinion 30, the central axis whereof is aligned with the rotational axis 14, this pinion meshing with a wheel 32 of an analogue display mechanism of the horological movement 2. The stator is configured so as to leave clear an angular sector 34 of the space of revolution 26, the apex angle α whereof is selected to allow for radial penetration of the wheel 32 in the space of revolution as far as the central shaft 16 while remaining in this angular sector. Remarkably, the pinion 30 is arranged between the two magnetic sheets 18 and 20 and has at least one part located between two geometric planes 38 and 39 defining said space of revolution about the rotational axis 14. Thus, the wheel 32 is partially arranged between the two magnetic sheets, in said angular sector of the space of revolution, so as to mesh with the pinion 30 to allow this wheel to be driven.

Preferably, the wheel 32 is configured and/or made of a specific material in order to reduce, or even eliminate eddy current losses. By way of example, the plate of the wheel 32 has a hub and a rim connected by several spokes. In an advantageous alternative embodiment, the material forming the plate is a metal alloy of the Inconel® type, the resistivity whereof is much greater than that of brass. In order to entirely eliminate the losses in question, the plate can be made of a synthetic material, for example polyoxymethylene ('POM'). In general, use of a magnetic material for the plate of the wheel is avoided. This also applies for the axle of the wheel 32 so as to prevent the rotor from exerting an attraction force on this axle, and vice-versa. More specifically, if this is not the case, friction losses would be generated at the bearings in which the wheel 32 and the rotor 8 pivot. The axle will, for example, be made of a copper-beryllium alloy or of plastics material.

According to an advantageous alternative embodiment, the wheel 32 extends in the general plane 25 of the two coils B1 and B2 with the axle 42 thereof arranged at the periphery of the rotor and the pinion 30 is arranged at this general plane. In particular, the apex angle α of the angular sector 34 provided for this wheel is greater than 120°. Preferably, this angle is greater than 130°. In the previous preferred alternative embodiment, the two coils are thus arranged in the same general plane, perpendicular to the rotational axis of the rotor, so as to occupy an angular sector, relative to this rotational axis, of less than 230°.

According to an advantageous alternative embodiment, the wheel 32 and the two coils B1 and B2 have dimensions such that the angular zones therebetween have an angle at the centre of less than 10° in order to allow the arrangement of coils with relatively large diameters.

The geometric angle β defined between the two axes 12 of the two coils B1 and B2 and the rotational axis 14 is equal to 104° in one specific alternative embodiment allowing the reduction ratio between the pinion 30 and the wheel 32 to be optimised while having an induced voltage in the coils that has an amplitude great enough to effectively drive the electric motor with relatively low electricity consumption. With a pole pitch of 120° for the rotor, the electric phase shift φ between the two induced voltage signals respectively generated in the two coils B1, B2 is equal to 48°, i.e. 360°/120° multiplied by 120°-104°. In an advantageous alternative embodiment, the electric phase shift φ has a value of between ten and ninety degrees included (10°≤φ≤90°). In a preferred alternative embodiment, the electric phase shift φ has a value of between thirty and sixty-five degrees (30°<φ<65°).

FIG. 5 diagrammatically shows, in table form, three specific alternatives to the main embodiment of the invention. These three alternatives have a common electric phase shift φ equal to 60° between the two coils of the electric motor, i.e. between the induced voltage signals thereof that are shown in the final column in the table. The first alternative comprises a rotor 3a having two pairs of magnets with alternating polarities (shown by cross-hatched discs) and arranged evenly over a ferromagnetic disc forming a magnetic sheet of the rotor. The geometric phase shift between the coil B2 and the closest magnet thereto is calculated when the coil B1 is aligned on one of the magnets. The mathematical equation between the electric phase shift and the aforementioned geometric phase shift is given by (360°/pole pitch)×geometric phase shift. The second alternative comprises, similarly to the alternative described in FIGS. 2 to 4, a rotor 3b having three pairs of magnets, with alternating polarities, which are arranged on a ferromagnetic disc. The third alternative comprises a rotor 3c having four pairs of magnets, with alternating polarities, which are evenly arranged on a ferromagnetic disc.

The electric motor of each of the three alternatives advantageously comprises two magnetic discs provided with magnets having axial polarisation, i.e. an arrangement similar to that of the alternative shown in FIG. 1. It can be seen that, for an electric phase shift φ equal to 60°, the second alternative has an advantage at the angular sector which is left clear in the plane of the two coils, in particular for the arrangement of a wheel as described hereinabove. More specifically, in this second alternative, the angle at the centre between the coils B1 and B2 is equal to 100°, whereas it is equal to 120° in the other two alternatives.

With reference to FIGS. 6 to 8B, an alternative embodiment of the device for controlling the electric motor according to the main embodiment is described, in addition to the functioning thereof according to a method for controlling the electric motor implemented in the control device.

Figure 6:
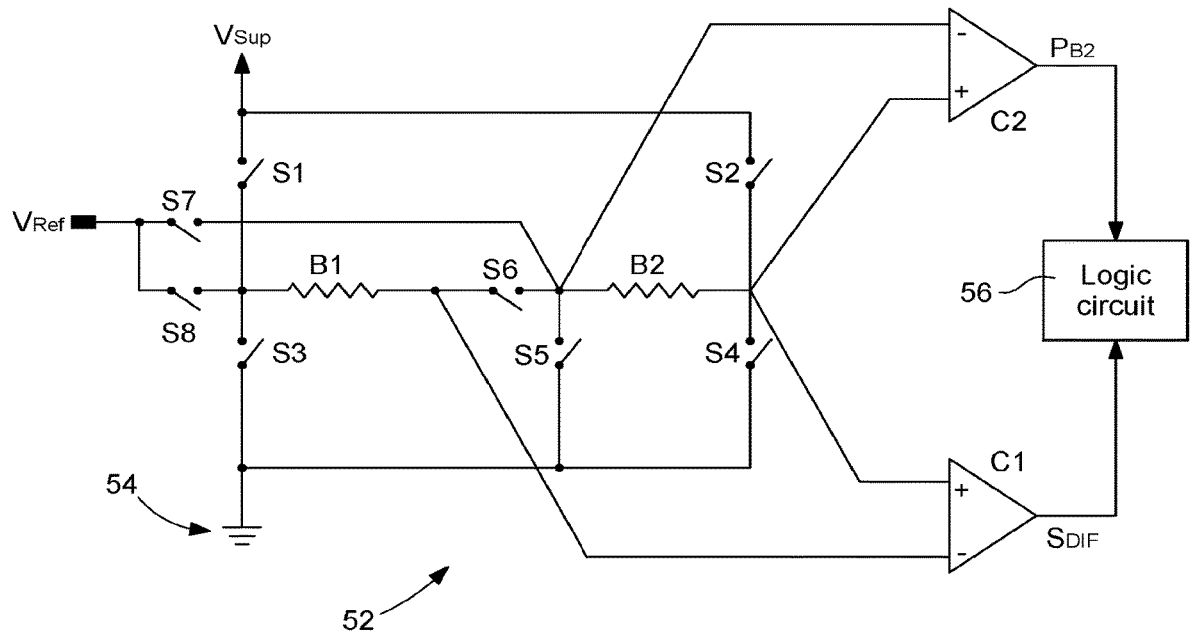
FIG. 6 shows a control device associated with the two coils of the stator of the main embodiment.
Figure 7:
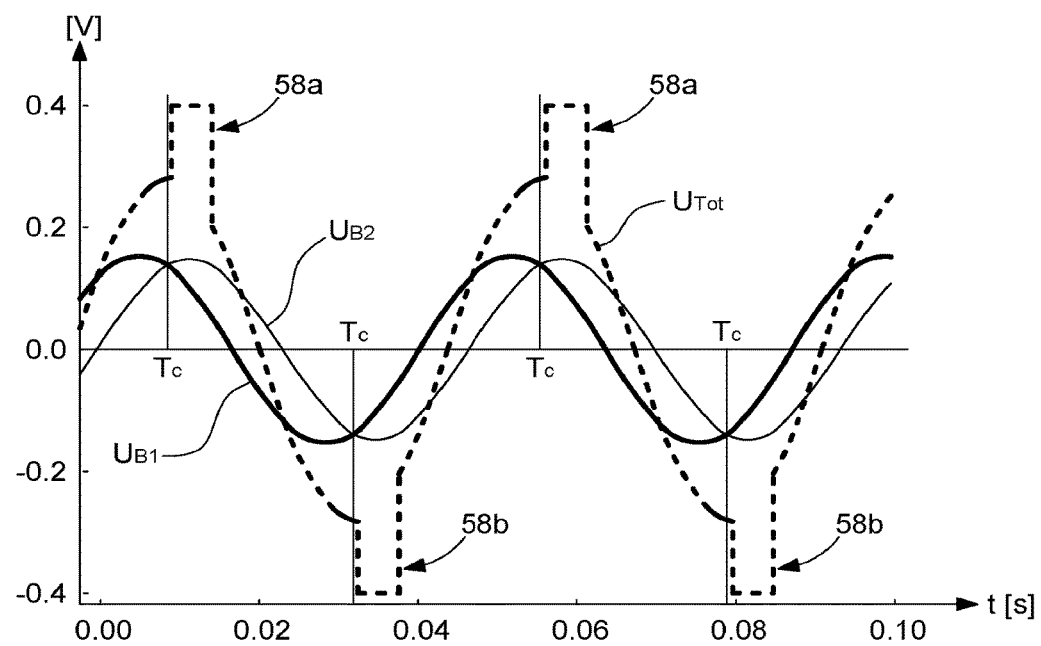
FIG. 7 shows the induced voltages in the two coils and the total induced voltage generated in the two coils arranged in series, as well as the application of driving voltage pulses according to an advantageous control method of the electric motor.

FIG. 6 shows the electric circuit of the control device 52 that manages the electrical power supply of the coils B1 and B2 in order to operate the electric motor, more particularly in order to apply driving voltage pulses 58a and 58b to the two coils (FIG. 7). This control device is connected to a power source supplying a supply voltage $V_{Sup}$ as well as a reference voltage $V_{Ref}$ which is derived from the supply voltage and which has an intermediate value between the earth 54 and the supply voltage, in particular a value equal to half of this supply voltage. A person skilled in the art knows various electric circuits that allow such a reference voltage to be generated.

The control device comprises four switches S1, S2, S3 and S4 arranged in a H bridge configuration relative to the two coils B1 and B2 so as to allow the symbol of the supply voltage applied through the two coils in a series configuration to be reversed and thus allow positive and negative voltage pulses to be applied. It should be noted that one alternative embodiment provides for applying positive voltage pulses such that the switch S4 can be omitted (wherein the switch S1 remains of use to start up the electric motor, as specified hereinbelow).

The term 'closed switch' is understood to be a switch in an on-state such that an electric current can pass therethrough. Thus, the term 'open switch' is understood to be a switch in an off-state such that no useful current can pass therethrough. An open switch isolates two elements that are arranged on either side of this switch.

The control device 52 further comprises at least one switch S5 arranged so as to allow the first phase and the second phase, i.e. the first coil B1 and the second coil B2 in the main embodiment, to be powered separately and selectively. The control circuit is arranged such that, during a start-up phase of the electric motor, it can firstly power one of the first or second phases in order to position the rotor, then the other of these first or second phases in order to cause the rotor to rotate in the desired direction. For example, in the alternative embodiment described, firstly the switches S2 and S5 are closed whereas the switches S1 and S4 are opened, thus only supplying the coil B2 with a positive voltage in order to bring it to face a magnet of the rotor. Preferably, the coil B1 is short-circuited by closing the switches S3 and S6 in order to dampen an oscillating movement of the rotor and accelerate the start-up positioning thereof. It should be noted that the switch S6 is provided for a detection circuit that will be described hereinafter. Then, the switches S2 and S3 are opened and the switch S1 is closed (the same applies for the switch S6 in the event that it is not already closed), such that only the coil B1 is supplied with a negative voltage. This allows a start pulse of a relatively long duration to be supplied and a good coupling to be obtained between the coil B1 and the magnets of the rotor, such that this rotor can be caused to rotate, in a predetermined direction of rotation, at a sufficient speed to then allow the rotation to be maintained by driving pulses. A start-up phase is thus obtained, followed by a rotation-maintaining phase.

The control device 52 further comprises a detection circuit comprising:
 a switch S6 momentarily allowing the coil B1 to be electrically isolated from the coil B2 to allow intersection times $T_C$ to be detected for the two induced voltage signals $U_{B1}$ and $U_{B2}$ which are respectively generated in the two coils when the rotor is rotating;
 a comparator C1, the two inputs whereof are respectively connected to a first terminal of the coil B1, which supplies the first induced voltage signal $U_{B1}$, and to a first terminal of the coil B2, which supplies the second induced voltage signal $U_{B2}$.

Figure 8A:
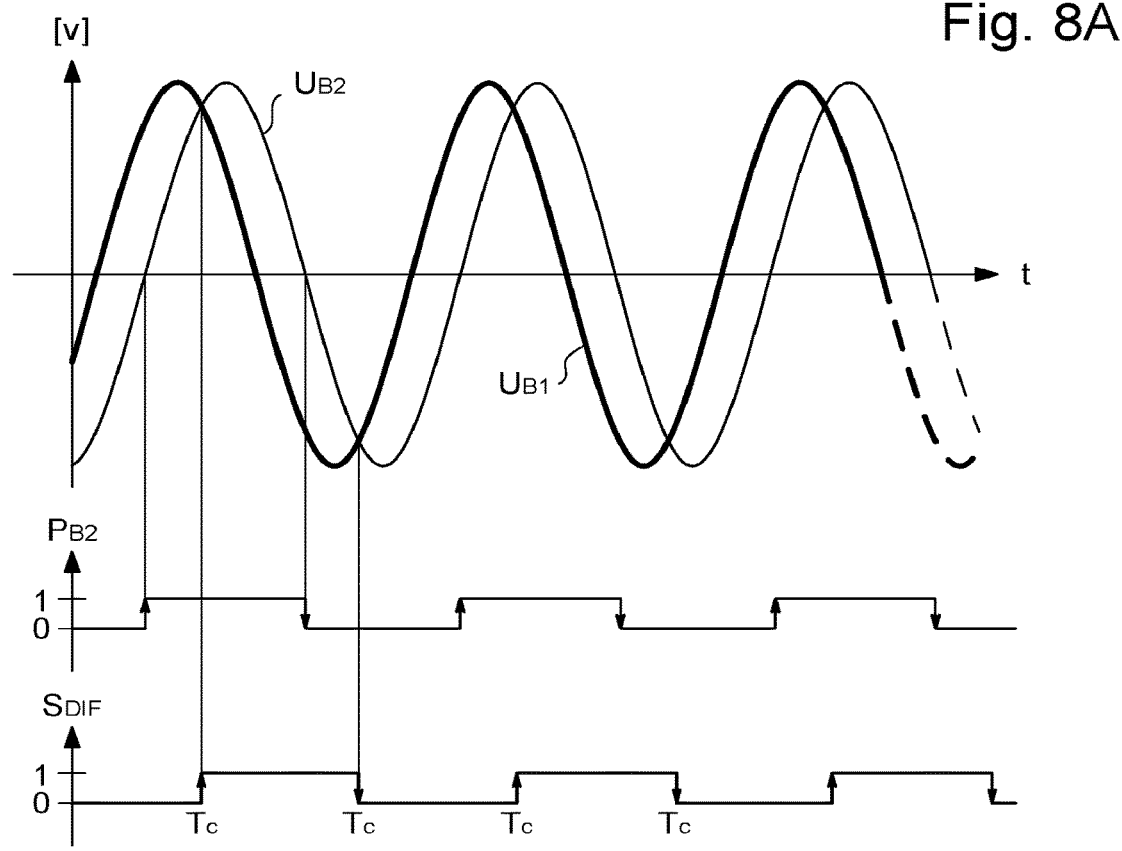
FIGS. 8A and 8B show the two induced voltages in the two coils and two signals derived from these two induced voltage signals in a periodic phase for detecting an intersection time of the two induced voltage signals as well as the direction of rotation.

The control device is arranged such that, during detection phases for detecting the intersection times $T_C$ by the detection circuit, the two corresponding second terminals of the two coils are momentarily connected via two respective switches S7 and S8 to a reference voltage $V_{Ref}$. The comparator C1 supplies, on the output side, a signal $S_{DIF}$ to a logic circuit 56 of the control device. This logic circuit is in particular used to manage, in terms of time, the openings and closings of the various switches of the control device. The two induced voltages and the signal $S_{DIF}$ are shown in FIG. 8A for normal functioning of the electric motor in the intended direction of rotation. It should be noted that the detection circuit proposed herein constitutes an alternative embodiment that is in no way limiting, and that other circuits can be provided by a person skilled in the art for this purpose. What is important within the scope of the present invention is that intersection times $T_C$ for the two induced voltage signals $U_{B1}$, $U_{B2}$ can be detected, which signals are offset relative to one another thanks to the arrangement of the two coils and the magnets of the rotor according to the invention. Moreover, the electricity consumption is sought to be minimised as much as possible. The configuration of the detection circuit proposed allows this to be achieved merely by using a simple analogue voltage comparator and a plurality of switches.

Figure 8B:
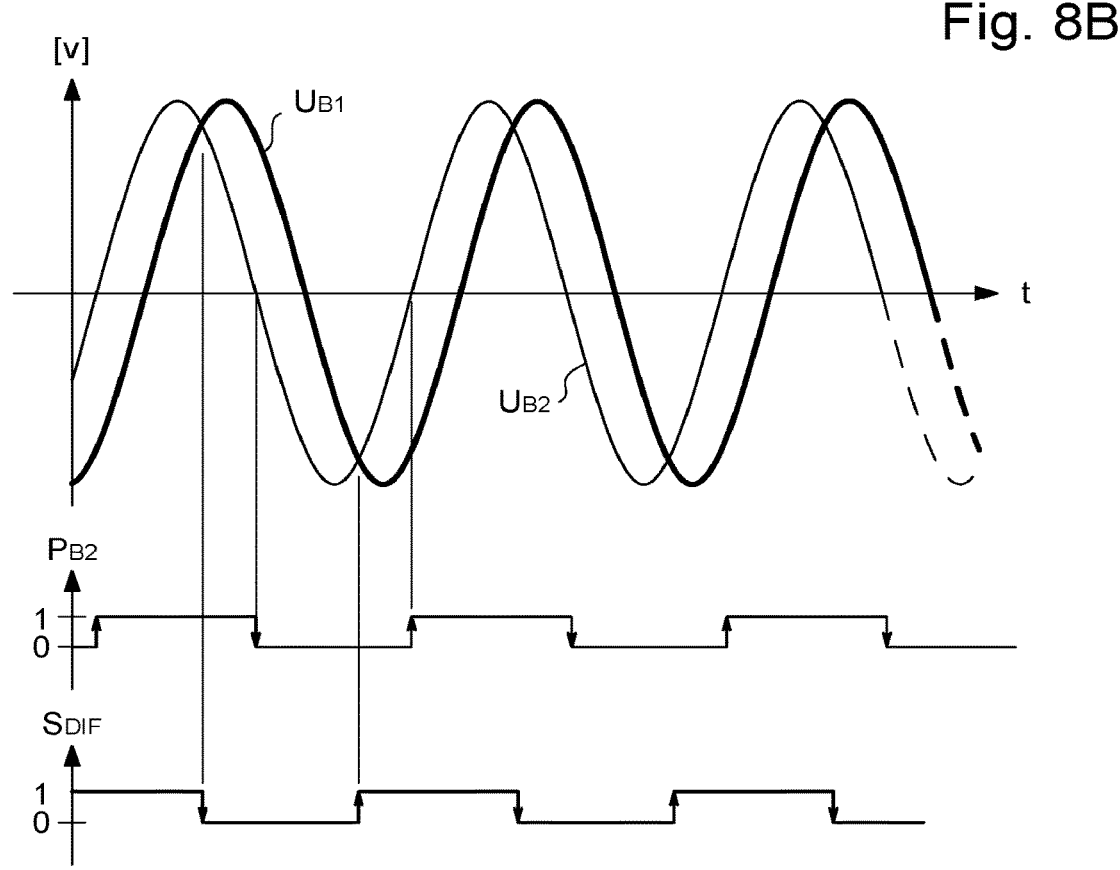

The control circuit 52 further comprises a comparator C2, the two inputs whereof are connected to the two terminals of the coil B2. This comparator C2 supplies, on the output side, a signal $P_{B2}$ indicating the symbol of the induced voltage signal $U_{B2}$. As shown in FIGS. 8A and 8B, the signal $P_{B2}$ and the signal $S_{DIF}$, supplied by the intersection times detection circuit, allow the direction of rotation of the rotor to be detected. In FIG. 8A corresponding to the intended direction of rotation, the rising edges of the signal $S_{DIF}$ occur when the signal $P_{B2}$ is in the logic state '1' thereof and the falling edges of the signal $S_{DIF}$ occur when the signal $P_{B2}$ is in the logic state '0' thereof. In FIG. 8B corresponding to a rotation in the opposite direction to the intended direction of rotation, the rising edges of the signal $S_{DIF}$ occur when the signal $P_{B2}$ is in the logic state '0' and the falling edges of the signal $S_{DIF}$ occur when the signal $P_{B2}$ is in the logic state '1'. If the control device detects that the rotor is rotating in the wrong direction, it will react to reverse the direction of rotation. The control device will quickly stop the rotor, for example by short-circuiting at least one coil, and it will directly carry out a new start-up phase.

FIG. 7 shows the generation of driving voltage pulses during the phase of maintaining the rotation of the rotor for a preferred alternative embodiment. In order to apply a driving pulse 58a with a positive voltage to the motor, the control device 52 closes, directly after the detection of an intersection time $T_C$ causing a rising edge in the signal $S_{DIF}$, the switches S2, S3, S6 and it opens all other switches. In order to apply a driving pulse 58b with a negative voltage to the motor, the control device 52 closes, directly after the detection of an intersection time $T_C$ causing a falling edge in the signal $S_{DIF}$, the switches S1, S4, S6 and it opens all other switches. Thus, upon the application of the driving pulses, the two coils B1 and B2 are arranged in series. In this configuration, at the outer terminals of the two coils in series, a total induced voltage $U_{Tot}$ appears, which is the sum of the two induced voltages $U_{B1}$ and $U_{B2}$.

In the preferred alternative embodiment, the initiation times at which the electric driving pulses are initiated occur directly after detections of corresponding intersection times, whereby no time delay means is provided for the generation of these electric driving pulses subsequent to the detections of the corresponding intersection times. Such a control method is advantageous since it allows the driving pulses to be applied in time zones that are close to the maximums, in absolute values, of the total induced voltage $U_{Tot}$, which allows for good electromagnetic coupling between the magnets of the rotor and the coils, and which also reduces the electrical energy lost by dissipation. It can more specifically be seen that, for two induced voltage signals $U_{B1}$ and $U_{B2}$, both having a sinusoidal shape with the same amplitude, the intersection times $T_C$ of these two signals correspond to the absolute maximums of the total induced voltage $U_{Tot}$ which is generated between the two outer terminals of the two coils in series. Thus, by detecting the intersection times via the detection circuit and by connecting the two coils in series, at least during the application of the voltage pulses, full advantage can be taken of the aforementioned observation, such that the rotor can be driven in an efficient and secure manner. It should be noted that the robustness of the control method described herein originates from the fact that each driving pulse is generated without any time delay after the detection of a corresponding intersection time. Thus, variations in the rotational speed of the rotor, in particular in the event of impacts or within the scope of the control method provided, will have no detrimental effect on the driving of this rotor, in particular on the efficiency of the electromagnetic coupling for the driving thereof or on the electricity consumption of the motor.

In an advantageous alternative embodiment, the supply voltage $V_{Sup}$, which is applied during the application of the driving pulses through the two coils arranged in series, is provided such that it is greater than the maximum value of the total induced voltage $U_{Tot}$ and less than one hundred and fifty percent (150%) of this maximum value when the rotor is rotating with a nominal angular speed. Electrical energy loss by dissipation is thus reduced. It should be noted that in order to supply a sufficient amount of energy to the rotor, the duration of the driving pulses and/or the frequency thereof can be adjusted. It should further be noted that the value of the supply voltage $V_{Sup}$ can be momentarily selected above the aforementioned range of values when power is needed to counter external disturbances (for example caused by a magnetic field or mechanical stresses). Finally, in one specific alternative embodiment, the control device is arranged so as to allow the two coils B1 and B2 to be momentarily arranged in parallel in order to be able to supply, in particular when subjected to external disturbances, additional current during driving pulses and thus apply a greater moment of force to the rotor.

The invention claimed is:

1. A continuously rotating electric motor comprising:
a rotor equipped with permanent magnets and a stator formed by coils magnetically coupled with the permanent magnets; wherein the permanent magnets and the coils are arranged such that the coils define, relative to the induced voltage generated in each of these coils when the rotor is rotated, substantially a first phase and a second phase, such that the two induced voltage signals respectively generated in any two coils of said coils are either in phase, or substantially have an electric phase shift q which corresponds to the electric phase shift between the first phase and the second phase, this electric phase shift having a value of between five and ninety degrees included; in that the electric motor comprises a control device comprising a circuit for detecting intersection times at which a first induced voltage signal, generated by the rotor rotating in one or more coils belonging to the first phase, has a value that is substantially equal to that of a second induced voltage signal, generated by the rotor rotating in one or more coils belonging to the second phase, the first and second induced voltage signals thus having said electric phase shift therebetween; and wherein the control device is arranged so as to be able to generate electric driving pulses in order to rotate the rotor, which pulses are respectively initiated at initiation times determined by respective intersection times, the control device being arranged such that said electric driving pulses can be applied to a set of coils formed by at least one coil of the first phase and by at least one coil of the second phase, which are arranged in series at least during application of the electric driving pulses.

2. The electric motor according to claim 1, wherein the electric phase shift φ has a value of between ten and ninety degrees included.

3. The electric motor according to claim 1, wherein the electric phase shift φ has a value of between thirty and sixty-five degrees.

4. The electric motor according to claim 1, wherein the control device further comprises at least one switch momentarily allowing the one or more coils generating said first induced voltage signal to be electrically isolated from the one or more coils generating said second induced voltage signal in order to allow said intersection times to be detected by the circuit for detecting; wherein the circuit for detecting comprises a comparator, the two inputs whereof are respectively connected to a first terminal of the one or more coils generating said first induced voltage signal and to a first terminal of the one or more coils generating said second induced voltage signal; and wherein the control device is arranged such that, during detection phases for detecting said intersection times, the two corresponding second terminals are momentarily connected via two respective switches to a reference voltage.

5. The electric motor according to claim 1, wherein the control device is arranged such that said initiation times at which said electric driving pulses are initiated occur directly after detections of corresponding intersection times, whereby no time delay means is provided for the generation of these electric driving pulses subsequent to the detections of the corresponding intersection times.

6. The electric motor according to claim 1, wherein the control device further comprises a comparator, the two inputs whereof are connected to two terminals of a coil or of a set of coils belonging to one of the first or second phases, so as to allow the direction of rotation of the rotor to be detected in association with the circuit for detecting intersection times.

7. The electric motor according to claim 1, wherein the supply voltage applied, upon application of said electric driving pulses, through said at least one coil of the first phase and said at least one coil of the second phase, which are thus arranged in series, is provided such that it is greater than the maximum value of the sum of the induced voltages thereof and less than one hundred and fifty percent of this maximum value when the rotor is turning with a nominal angular speed.

8. The electric motor according to claim 1, wherein the control device further comprises at least one switch arranged so as to allow at least one coil of the first phase and at least one coil of the second phase to be powered separately and selectively, the control device being arranged such that it can, during a start-up phase of the electric motor, firstly power one of the first or second phases in order to position the rotor, then the other of these first or second phases in order to cause the rotor to rotate in the desired direction.

9. The electric motor according to claim 1, wherein the stator is formed by only two flat coils which respectively constitute the first and second phases, whereby the permanent magnets of the rotor have an alternating axial polarisation.

10. A watch movement comprising:
the electric motor according to claim 9, wherein the two coils are arranged in a same general plane, perpendicular to the rotational axis of the rotor, so as to occupy an angular sector, relative to the rotational axis of the rotor, of less than 230° to allow a wheel for transmitting the rotational movement of the rotor to be arranged in this general plane, the rotor comprising, for this purpose, a pinion arranged at said general plane and the central axis whereof is aligned with the rotational axis of the rotor.

* * * * *

UNITED STATES PATENT AND TRADEMARK OFFICE
CERTIFICATE OF CORRECTION

PATENT NO. : 10,985,679 B2
APPLICATION NO. : 16/687803
DATED : April 20, 2021
INVENTOR(S) : Born et al.

Page 1 of 1

It is certified that error appears in the above-identified patent and that said Letters Patent is hereby corrected as shown below:

In the Claims

In Column 11, Claim 1, Line 55, delete "q" and insert -- $\varphi$ --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*